US011853572B2

United States Patent
Gopalakrishnan et al.

(10) Patent No.: US 11,853,572 B2
(45) Date of Patent: Dec. 26, 2023

(54) ENCODING-AWARE DATA ROUTING (71) Applicant: Western Digital Technologies, Inc., San Jose, CA (US)

(72) Inventors: Raghavendra Gopalakrishnan, Karnataka (IN); Vivek Kumar, Uttar Pradesh (IN)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 17/737,877

(22) Filed: May 5, 2022

(65) Prior Publication Data
US 2023/0359378 A1 Nov. 9, 2023

(51) Int. Cl.
G06F 3/06 (2006.01)
G06F 12/02 (2006.01)

(52) U.S. Cl.
CPC ............ *G06F 3/064* (2013.01); *G06F 3/0659* (2013.01); *G06F 3/0679* (2013.01); *G06F 12/0253* (2013.01); *G06F 3/0604* (2013.01)

(58) Field of Classification Search
CPC ...... G06F 3/0604; G06F 3/064; G06F 3/0646; G06F 3/0647; G06F 3/0653; G06F 3/0659; G06F 3/0679; G06F 12/0253; G11C 11/5628; G11C 11/5642; G11C 16/3418; G11C 16/3427; G11C 16/3431; G11C 2211/562; G11C 2211/563; G11C 2211/5641; G11C 2211/5644

USPC .......... 365/185.02, 185.03; 711/154; 714/6.2
See application file for complete search history.

(56) References Cited

U.S. PATENT DOCUMENTS

| | | | |
|---|---|---|---|
| 9,798,656 B2 | 10/2017 | Lee et al. | |
| 11,036,407 B1 | 6/2021 | Tikoo et al. | |
| 2016/0141026 A1* | 5/2016 | Lee | G11C 16/10 365/185.12 |
| 2016/0141047 A1* | 5/2016 | Sehgal | G11C 11/5628 365/185.02 |
| 2020/0118636 A1* | 4/2020 | Athreya | G06F 3/0659 |
| 2021/0064535 A1 | 3/2021 | Han et al. | |
| 2021/0382818 A1 | 12/2021 | Sharma et al. | |
| 2022/0164123 A1* | 5/2022 | Kim | G06F 3/0659 |

FOREIGN PATENT DOCUMENTS

CN 11190834 A 5/2020

* cited by examiner

*Primary Examiner* — Ilwoo Park
(74) *Attorney, Agent, or Firm* — ARENTFOX SCHIFF LLP (57) ABSTRACT

Aspects of the disclosure are directed to a storage device including a memory and a controller. The memory may include a plurality of flash memory blocks such as single level cell (SLC) blocks and multi-level cell (MLC) blocks. The controller may maintain a read count of each of the SLC blocks to determine which of the blocks contains data associated with the highest number of read commands. Based on the read commands, the controller may relocate the associated data into pages of MLC blocks that have a lower number of senses required to read the data stored in those blocks.

20 Claims, 10 Drawing Sheets

| Type of NAND | Encoding | Number of Sense(s) for Each Page | Number of Cells |
|---|---|---|---|
| BICS4-X3 | 2-3-2 | LP-2, MP-3, UP-2 | TLC |
| BICS5-X3 | 1-3-3 | LP-1, MP-3, UP-3 | TLC |
| BICS6-X3 | 2-3-2 | LP-2, MP-3, UP-2 | TLC |
| BICS4-X4 | 4-4-3-4 | LP-4, MP-4, UP-3, TP-4 | QLC |
| BICS6-X4 | 4-3-4-4 | LP-4, MP-3, UP-4, TP-4 | QLC |
| BICS5-X4 | 1-2-4-8 | LP-1, MP-2, UP-4, TP-8 | QLC |
| BICS5-X5 | 1-2-4-8-16 | LP-1, MP-2, UP-4, TP-8, NTP-16 | PLC |

ENCODING-AWARE DATA ROUTING

BACKGROUND

Field

This disclosure is generally related to electronic devices and more particularly to storage devices.

INTRODUCTION

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

Flash storage devices include dies containing blocks of NAND cells at the mapped physical addresses of flash memory. NAND flash is a form of nonvolatile storage memory, which allows it to retain data without being attached to a power source. Single-level cell (SLC) flash uses a relatively higher grade of NAND memory, storing 1-bit per cell and always in one of two voltage states: programmed (e.g., denoted as 0), or erased (e.g., denoted as 1). Since SLC flash stores fewer data bits per cell, it may be a more costly form of storage memory than multi-level cell (MLC) flash.

Multi-level cell (MLC) flash is a type of NAND flash memory that can store more than 1 bit per cell. An MLC may relate to any flash cell configured to store 2 or more bits per cell (e.g., a triple-level cell (TLC), a quad-level cell (QLC), a penta-level cell (PLC), etc.). Different types of MLC NAND devices may use different encoding mechanisms, and thus, the number of senses for reading data from an MLC block may vary. For example, BiCs5-X3 NAND technology may be defined by NAND read operation encoding as 1-3-3 state coding. This essentially means that there is one sense for a lower page, three senses for a middle page, and three senses for an upper page to read the data from MLC pages.

There exists a need for further improvements in flash storage technology. These improvements may also be applicable to other multi-access technologies and the telecommunication standards that employ these technologies.

SUMMARY

Certain aspects are directed to a storage device including multiple memory devices comprising a first single-level cell (SLC) block, a second SLC block, a multi-level cell (MLC) block, and a controller coupled to the multiple memory devices. In some examples, the controller is configured to compare a first read counter to a second read counter to determine that the first read counter is greater than the second read counter, wherein the first SLC block contains first data and is associated with the first read counter, and wherein the second SLC block contains second data and is associated with the second read counter. In some examples, the controller is configured to in response to the determination that the first read counter is greater: transfer the first data from the first SLC block to a first page of the MLC block, wherein the first page is selected for transfer of the first data based on: (i) the first read counter being greater than the second read counter, and (ii) the first page corresponding to fewer number of senses than a second page of the MLC block. In some examples, the controller is configured to transfer the second data from the second SLC block to the second page of the MLC block.

Certain aspects are directed to a storage device including multiple memory devices comprising a first single-level cell (SLC) block, a second SLC block, a first multi-level cell (MLC) block, and a second MLC block, a controller coupled to the multiple memory devices. In some examples, the controller is configured to select the first MLC block for a relocation process, wherein the first MLC block contains one or more of a first data and a second data, wherein the first data is associated with a first read counter, and wherein the second data is associated with a second read counter. In some examples, the controller is configured to compare the first read counter to the second read counter to determine that the first read counter is a greater number than the second read counter. In some examples, the controller is configured to in response to the determination that the first read counter is greater: transfer the first data from the first MLC block to the first SLC block. In some examples, the controller is configured to transfer the second data to one of the first SLC block or the second SLC block, wherein the first SLC block is designated as a block containing data associated with the greater number.

Certain aspects are directed to a method for segregating data in a multi-level cell (MLC) block. In some examples, the method includes comparing a first read counter to a second read counter to determine that the first read counter is greater than the second read counter, wherein the first SLC block contains first data and is associated with the first read counter, and wherein the second SLC block contains second data and is associated with the second read counter. In some examples, the method includes, in response to the determination that the first read counter is greater: transferring the first data from the first SLC block to a first page of the MLC block, wherein the first page is selected for transfer of the first data based on: (i) the first read counter being greater than the second read counter, and (ii) the first page corresponding to fewer number of senses than a second page of the MLC block, and transferring the second data from the second SLC block to the second page of the MLC block.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

As discussed, flash storage devices may include dies containing blocks of NAND cells at a mapped physical addresses of flash memory. Single-level cell (SLC) flash uses a higher grade of NAND memory relative to multi-level cell (MLC) flash, storing 1-bit per cell and always in one of two voltage states: programmed (e.g., denoted as 0), or erased (e.g., denoted as 1). Since SLC flash stores fewer data bits per cell, it may be a more costly form of storage memory than MLC.

One benefit of MLC flash is that it can store more than 1 bit per cell. An MLC may relate to any flash cell configured to store 2 or more bits per cell (e.g., a triple-level cell (TLC), a quad-level cell (QLC), a penta-level cell (PLC), etc.). Different types of MLC NAND devices may use different encoding mechanisms, and thus, the number of senses for reading data from an MLC block may vary. For example, a BiCs5-X3 NAND may be defined by NAND read operation encoding as 1-3-3 state coding. This essentially means that there is one sense for a lower page, three senses for a middle page, and three senses for an upper page to read the data from MLC pages.

In certain aspects, data stored on an SLC or MLC may become invalidated. To remove the invalidated data from the flash memory, the flash storage device may perform a garbage collection (GC) process in which valid data may be copied to a new block (e.g., another SLC/MLC) and the invalidated data is erased from the old block. However, there is currently no data segregation of hot/cold data when it is copied to the new block. For example, data that is frequently read may be referred to as hot data, while data that is read relatively less may be referred to as cold data.

Accordingly, aspects of the disclosure are directed to segregating hot data to a particular page(s) of the new MLC block. Using the example above, the BiCs5-X3 has NAND read operation encoding as 1-3-3. In other words, the lower page requires two less senses to read than the middle and upper pages. As such, when valid data is copied to a new MLC block, hot data may be copied to the lower page (e.g., the page that only requires one sense for a read), and relatively colder data may be copied to the middle and upper pages (e.g., the pages that require three senses for a read).

By segregating the data thusly, frequently read data (e.g., hot data) may be read faster than cold data because it is stored in pages with a reduced number of senses. This may improve the rate at which hot data is read and may therefore improve performance of the storage device. Moreover, by segregating the hot data to low sense pages, the MLC read endurance may be increased. For example, stress on the MLC may be reduced by storing hot data in low-sense pages because instead of storing the hot data on a page that requires three senses, it is stored on a page that only requires one.

Moreover, in some cases, a "low-capacity" storage device may benefit from such data segregation because of the increased throughput provided by storing hot data in a low-sense page. For example, a low-capacity storage device may relate to storage devices that have a low number of dies and/or a lack of parallel dies. Such devices often become bottlenecked due to the lack of parallelism and/or reduced cache.

Accordingly, increasing the rate at which hot data read commands are executed by storing hot data in a low-sense page may help reduce bottlenecking.

Figure 1:
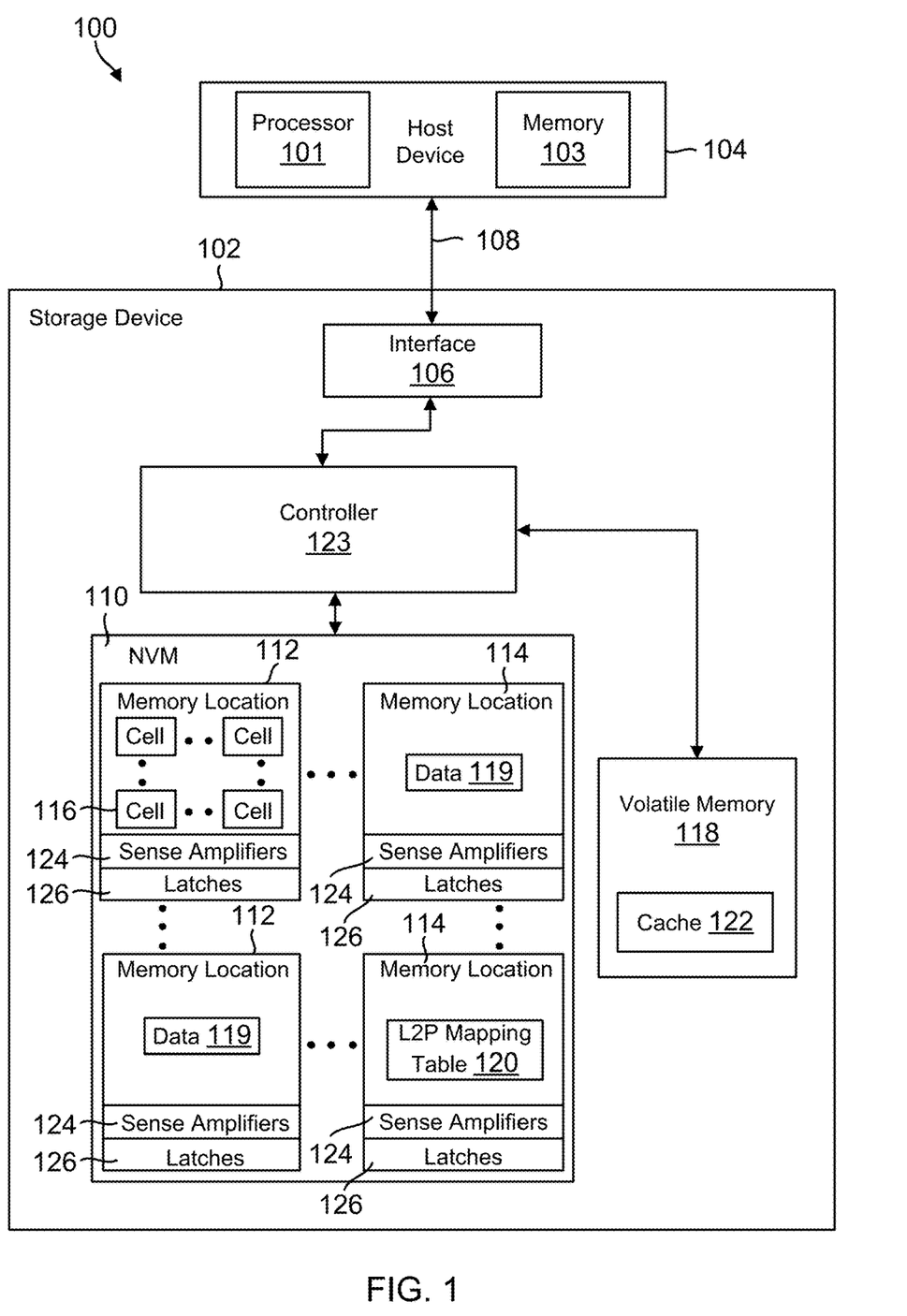
FIG. 1 is a block diagram illustrating an exemplary embodiment of a storage device in communication with a host device.

FIG. 1 shows an exemplary block diagram 100 of a storage device 102 which communicates with a host device 104 (also "host") according to an exemplary embodiment. The host device 104 and the storage device 102 may form a system, such as a computer system (e.g., server, desktop, mobile/laptop, tablet, smartphone, etc.). The components of FIG. 1 may or may not be physically co-located. In this regard, the host device 104 may be located remotely from storage device 102. Although FIG. 1 illustrates that the host device 104 is shown separate from the storage device 102, the host device 104 in other embodiments may be integrated into the storage device 102, in whole or in part. Alternatively, the host device 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general-purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host device 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host device 104 using, for example, cellular communication (e.g., 5G NR, 4G LTE, 3G, 2G, GSM/UMTS, CDMA One/CDMA2000, etc.), wireless distribution methods through access points (e.g., IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host device 104. The NVM 110 can include, for example, flash integrated circuits, NAND memory (e.g., SLC memory, multi-level cell (MLC) memory, TLC memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g., NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host device 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
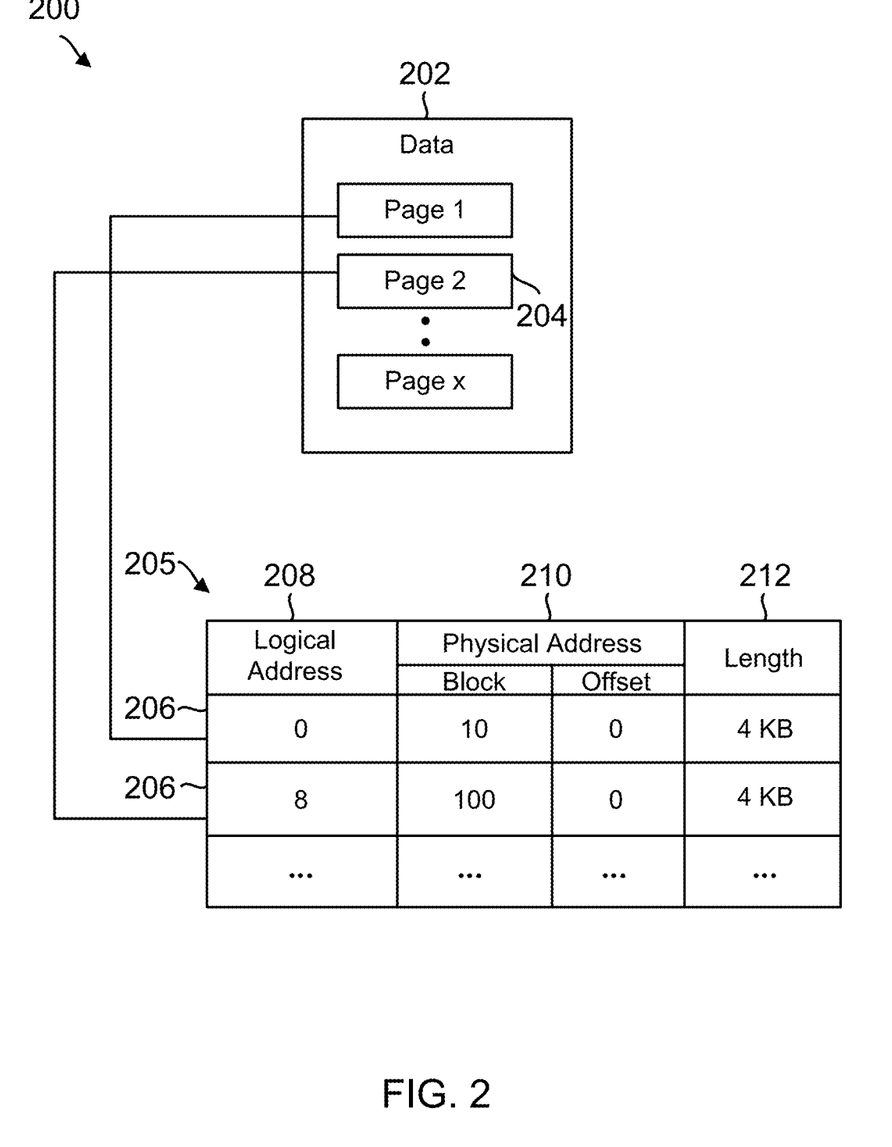
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g., 4 KB or some other size).

Referring back to FIG. 1, the volatile memory 118 also stores a cache 122 for the storage device 102. The cache 122 includes entries showing the mapping of logical addresses specified for data requested by the host device 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g., it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g., readable as a '0' or a '1'), and the sensed data is stored in the data latches 126. It should be noted that a number of senses required to read data may vary across pages of a multi-level cell. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an ASIC, a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g., translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The host interface 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host device 104 may retrieve data from the storage device 102 by sending a read command specifying one or more logical addresses associated with the data to be retrieved from the storage device 102, as well as a length of the data to be read. The host interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host device 104 via the host interface 106.

Figure 3:
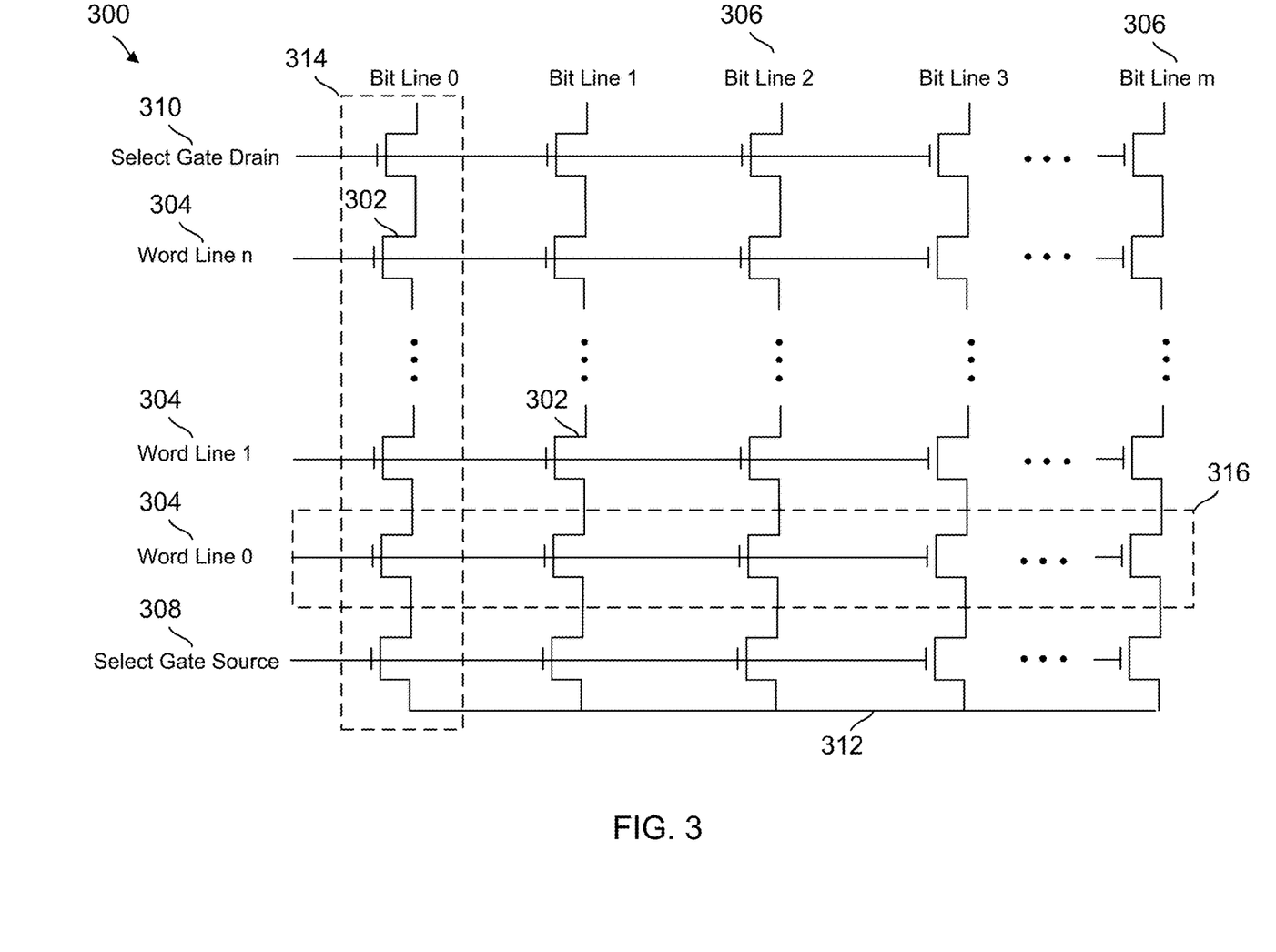
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g., using a row and column decoder). For example, word lines 0-n may each be associated with their own row address (e.g., word line 0 may correspond to word line address 0, word line 1 may correspond to word line address 1, etc.), and bit lines 0-m may each be associated with their own column address (e.g., bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g., ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
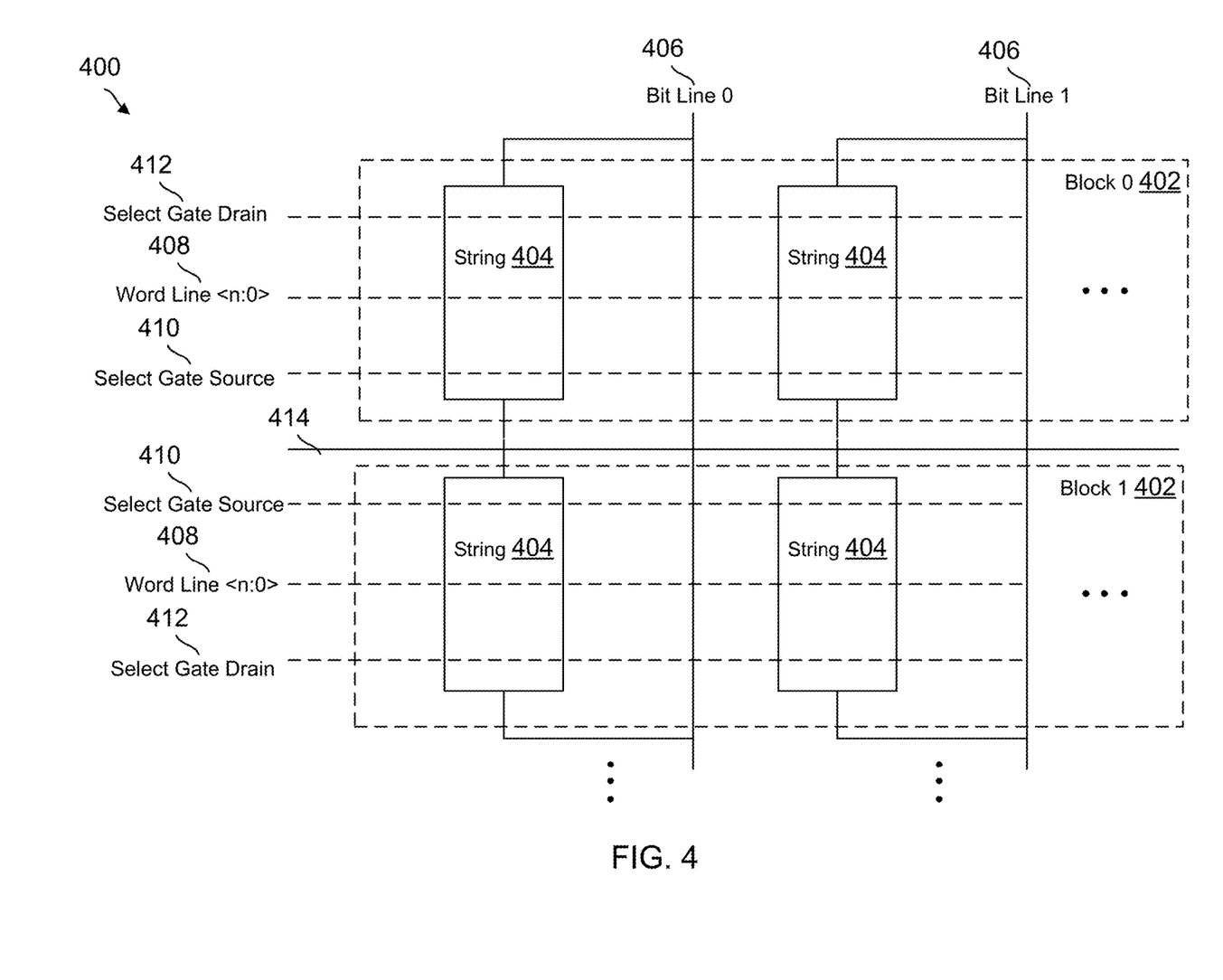
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (e.g., on a word line 304, 408), the controller may send a command to apply a read voltage or program voltage to the selected word line and a pass through voltage to the other word lines. The read or programmed state of the cell (e.g., a logic '0' or a logic '1' for SLCs) may then be determined based on a threshold voltage of the cells 302. For example, during an SLC read operation, if the threshold voltage of a cell 302 is smaller than the read voltage (e.g., current flows through the cell in response to the read voltage), the controller 123 may determine that the cell stores a logic '1', while if the threshold voltage of the cell 302 is larger than the read voltage (e.g., current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g., to a substrate of the cells such as a p-well) until the cells reduce back below the threshold voltage (back to logic '1').

For cells that store multiple bits (e.g., MLCs, TLCs, etc.), each word line 304, 408 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 408 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 408 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 5:
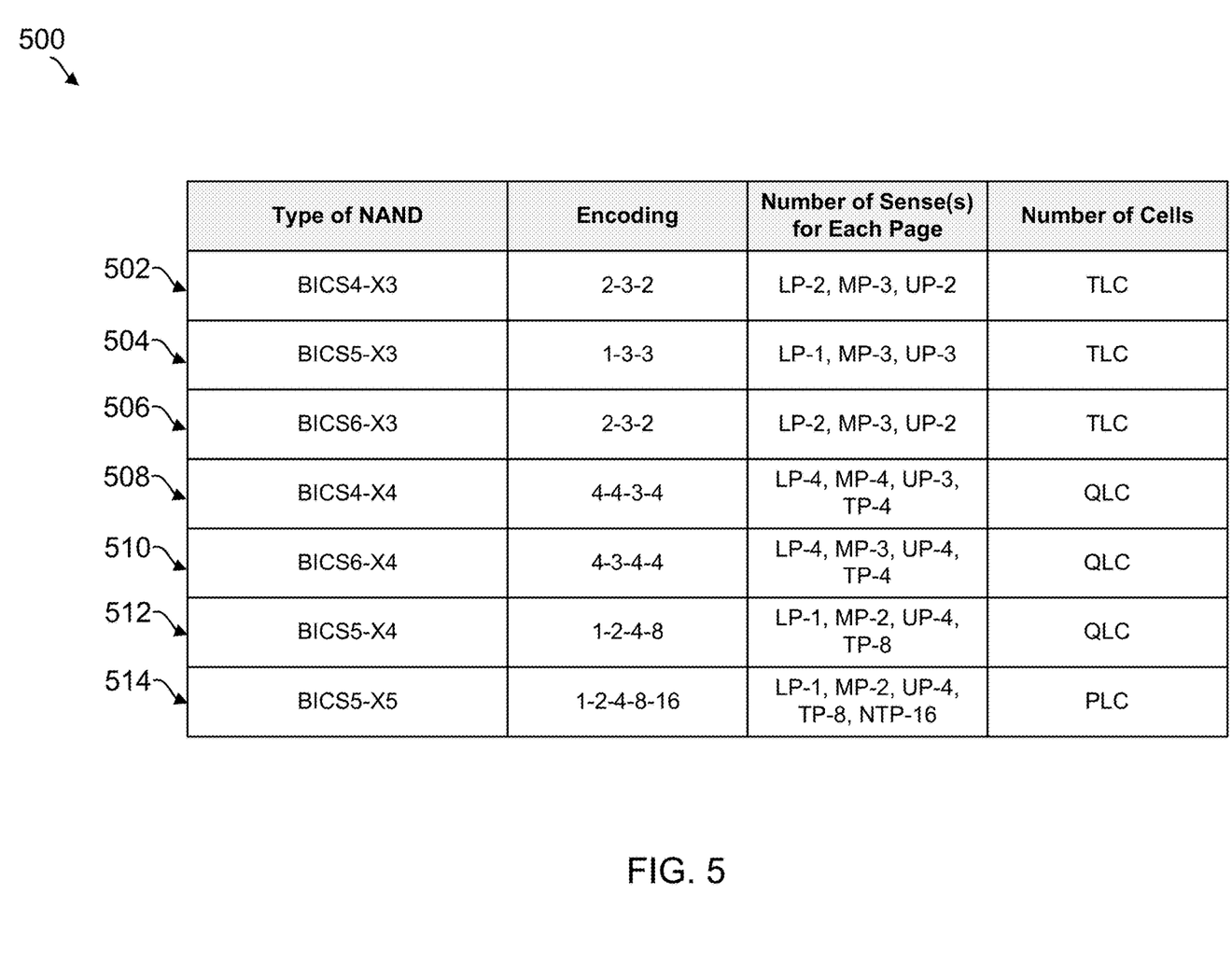
FIG. 5 is a table illustrating a plurality of example encoding mechanisms used in different MLC NANDs.

FIG. 5 is a table 500 illustrating a plurality of example encoding mechanisms used in different MLC NANDs. A top row of the table includes four fields: Type of NAND (e.g., multiple different types of bit cost scalable (BICS) flash memories), Encoding (e.g., a sensing scheme for performing a read of a page of the flash memory, corresponding to a particular type of NAND), Number of Sense(s) for Each Page (e.g., a number of senses for reading each page), and Number of Cells.

A first row 502 corresponds to a BICS4-X3 with a 2-3-2 encoding, wherein a lower page has a 2-sense read (e.g., LP-2), a middle page has a 3-sense read (e.g., MP-3), and an upper page has a 2-sense read (e.g., UP-2). A second row 504 corresponds to a BICS5-X3 with a 1-3-3 encoding, wherein a lower page has a 1-sense read (e.g., LP-1), a middle page has a 3-sense read (e.g., MP-3), and an upper page has a 3-sense read (e.g., UP-3). A third row 506 corresponds to a BICS6-X3 with a 2-3-2 encoding, wherein a lower page has a 2-sense read (e.g., LP-2), a middle page has a 3-sense read (e.g., MP-3), and an upper page has a 2-sense read (e.g., UP-2). A fourth row 508 corresponds to a BICS4-X4 with a 4-4-3-4 encoding, wherein a lower page has a 4-sense read (e.g., LP-4), a middle page has a 4-sense read (e.g., MP-4), an upper page has a 3-sense read (e.g., UP-3), and a top page has a 4-sense read (e.g., TP-4). A fifth row 510 corresponds to a BICS6-X4 with a 4-3-4-4 encoding, wherein a lower page has a 4-sense read (e.g., LP-4), a middle page has a 3-sense read (e.g., MP-3), an upper page has a 4-sense read (e.g., UP-4), and a top page has a 4-sense read (e.g., TP-4). A sixth row 512 corresponds to a BICS5-X4 with a 1-2-4-8 encoding, wherein a lower page has a 1-sense read (e.g., LP-1), a middle page has a 2-sense read (e.g., MP-2), an upper page has a 4-sense read (e.g., UP-4), and a top page has an 8-sense read (e.g., TP-8). Finally, a seventh row 514 corresponds to a BICS5-X5 with a 1-2-4-8-16 encoding, wherein a lower page has a 1-sense read (e.g., LP-1), a middle page has a 2-sense read (e.g., MP-2), an upper page has an 4-sense read (e.g., UP-4), a top page has an 8-sense read (e.g., TP-8), and a next-top page has a 16-sense read (NTP-16).

As discussed, hot data may be stored in pages with relatively low senses. For example, when valid hot data is copied from an SLC/MLC block and moved to another MLC (e.g., BICS5-X4) during a garbage collection (GC) operation, the hot data may be moved to the lower page (LP-1) or middle page (MP-2). Whether data can be considered hot/cold depends on whether the SLC/MLC block from which the data is copied has a high number of reads relative to other SLC/MLC blocks, or the number of reads associate with the SLC/MLC block exceeds a threshold value.

Figure 6:
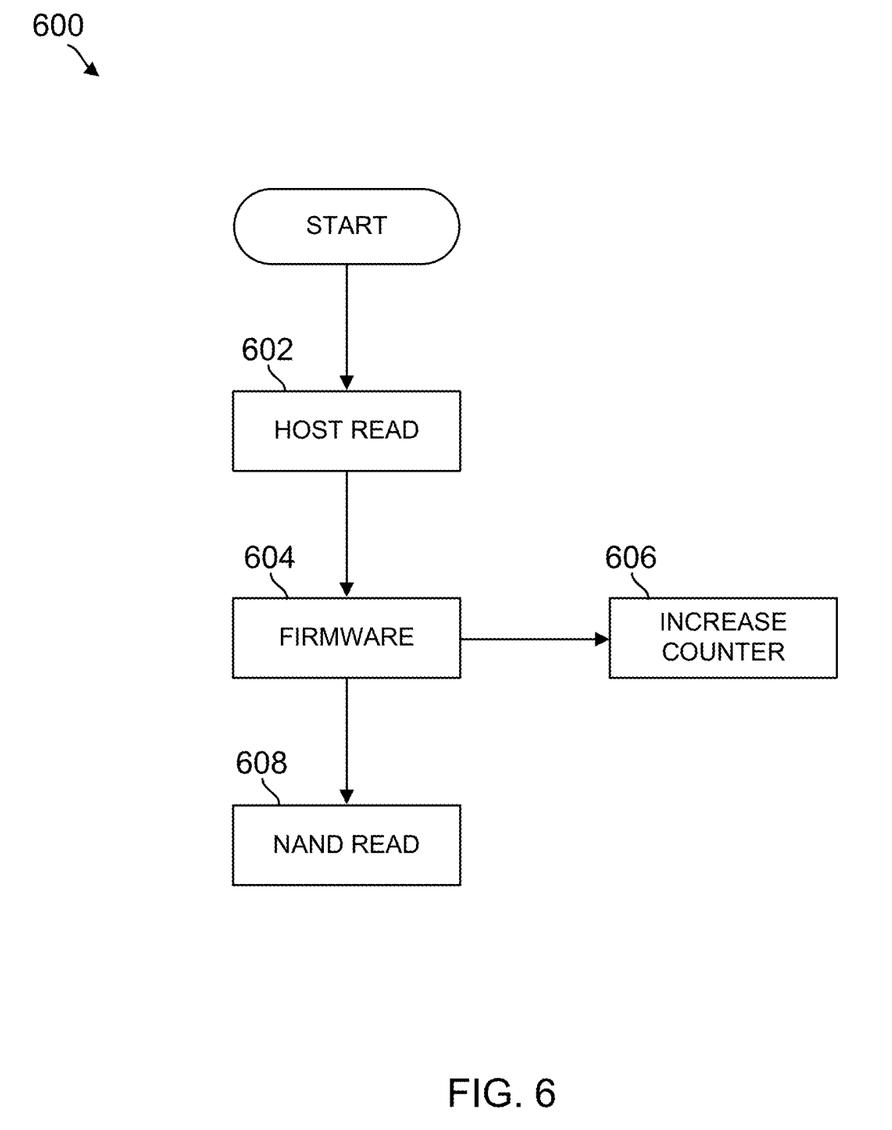
FIG. 6 is a flow chart illustrating an example counter for tracking a number of host read commands associated with an single-level cell (SLC) or multi-level cell (MLC) block.

FIG. 6 is a flow chart illustrating example read counter operations 600 for tracking a number of host read commands associated with an SLC/MLC block. Initially, a memory controller (e.g., controller 123 of FIG. 1) may receive a read command from the host (e.g., host device 104 of FIG. 1) at a first block 602. The read command may be directed to a particular block associated with an SLC/MLC flash. At a second block 604, controller firmware may increase a counter 606 associated with the particular block. The firmware may maintain such a counter for each block in order to track a number of read commands received for each of the blocks during a window of time (e.g., starting when data is moved to a block, and ending when the data is moved from the block). At a third block 608, the controller may then perform the read command by reading the data in the particular block.

Figure 7A:
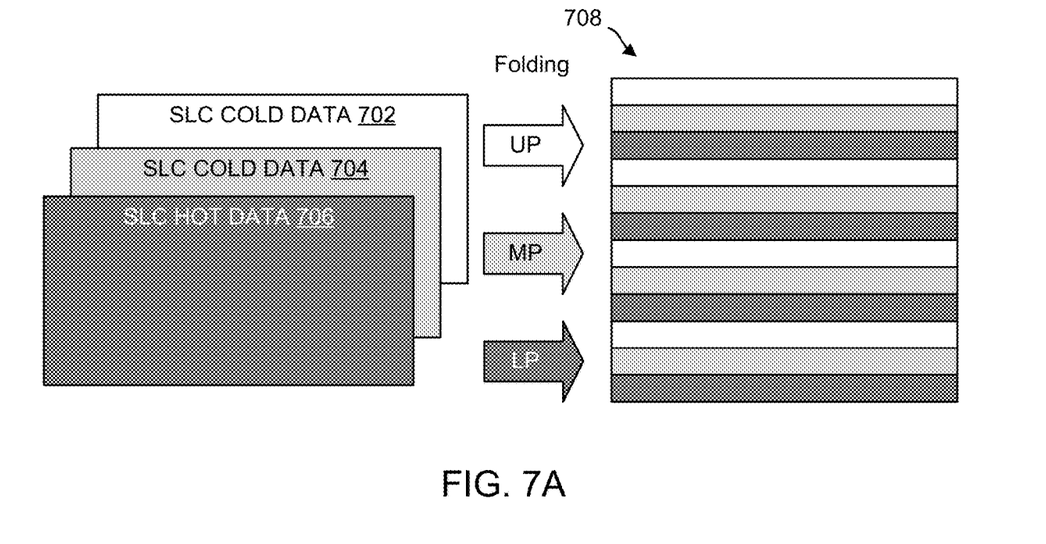
FIGS. 7A and 7B are block diagrams illustrating example data relocation aspects.

FIG. 7A is a block diagram illustrating example data relocation aspect. Initially, data may be stored on SLC blocks. Here, a first cold data 702 is stored on a first SLC block, a second cold data 704 is stored on a second SLC block, and hot data 706 is stored on a third SLC block. In this example, all the data is determined to be valid data.

A number of reads associated with the first block and the second block may be relatively low (e.g., 30,000 reads and 40,000 reads, respectively). However, a number of reads associated with the third SLC block may be relatively high (e.g., 100,000 reads). In this example, a controller may determine that the hot data 706 is "hot" because it is associated with a block that has the highest number of read commands associated with it relative to the first block and the second block. That is, among the blocks that contain data being relocated, the block with the highest count of read commands associated with it is considered to have hot data.

During relocation from the SLC block to the TLC block, the data contained in all three SLC blocks may be copied to a respective page in the TLC block. As illustrated, the first cold data 702, the second cold data 704, and the hot data 706 are folded into one TLC block 708 (e.g., BICS5-X3, wherein the encoding is 1-3-3). Because the hot data 706 is associated with the block with the highest read command count, the hot data 706 may be folded as lower page (e.g., LP-1) in the TLC block 708 so that only one sense is required to read the hot data from the TLC block 708. The first cold data 702 and the second cold data 704 may be copied to the middle page (e.g., MP-3) and the upper page (e.g., UP-3). Accordingly, the hottest data (e.g., the data this is associated with the most read commands) only requires one sense, while relatively colder data may require more senses. By this, the data stored in the TLC block 708 may be read with fewer senses than if the hot data required three senses.

It should be noted that a number of reads may be maintained by the controller for the first cold data 702, the second cold data 704, and the hot data 706 after being copied into the TLC block 708. In some examples, LP-1 may be associated with the third SLC block, MP-3 may be associated with the second SLC block, and UP-3 may be associated with the first SLC block. Thus, corresponding read counters may be maintained for each of the pages of the TLC block 708 (e.g., there may be three SLCs each maintaining a separate counter for one of the three pages of the TLC 708). Thus, when the controller receives a read command for a page on the TLC block 708, the corresponding SLC counter is affected.

Figure 7B:
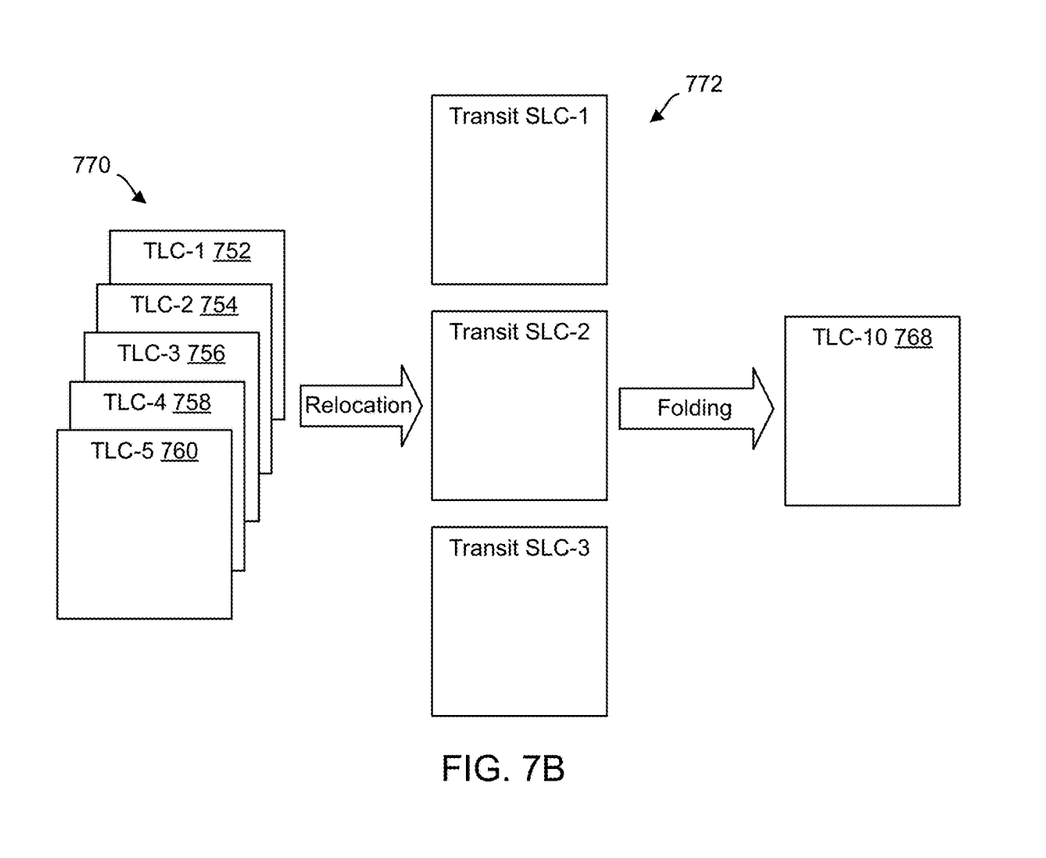

FIG. 7B is a block diagram illustrating example data relocation aspect. In this example, data from multiple MLC blocks 770 is relocated to a plurality of SLC blocks 772, then folded into a single MLC block (e.g., TLC block 768). The multiple MLC blocks 770 include five TLC blocks (e.g., TLC-1 752, TLC-2 754, TLC-3 756, TLC-4 758, and TLC-5 760). Although the multiple MLC blocks 770 are illustrated as having 5 blocks and the SLC blocks 772 are illustrated as having 3 blocks, any number of blocks in either group is contemplated and within the scope of the disclosure. Moreover, although the multiple MLC blocks 770/768 are shown as TLC blocks, such blocks may include any suitable multi-level flash memory block.

Initially, data stored on the multiple MLC blocks 770 may be relocated to one or more SLC blocks 772 during to a GC operation (e.g., due to physical fullness of the multiple MLC blocks 770 and/or data being invalidated). For example, if a validity count is relatively low for a TLC block, then the data on the block may be invalidated. Invalidated data may be erased instead of moved to one of the SLC blocks 772. Accordingly, in some examples, some of the data stored on the multiple MLC blocks 770 may not be moved to the SLC blocks 772 due to invalidation of the data, but the valid data may be moved to the SLC blocks 772 in the relocation process. It should be noted that an SLC block may hold the data of one or more MLC blocks.

Once the valid data is relocated from the multiple MLC blocks 770 to the SLC blocks 772, a read counter associated with each of the SLC blocks 772 may be reset and may begin counting read commands from the host directed to each of the SLC blocks 772. The valid data may then be folded into the TLC block 768 according to the "hotness" of the data. For example, the hottest data may be copied into a page of the TLC block 768 that requires the least number of senses to execute a read command, whereas relatively colder data may be copied into pages of increased senses.

In one example, after the relocation, the SLC blocks 772 may contain hot data (e.g., data associated with a block having 100,000 read counter), first warm data (e.g., data associated with a block having 60,000 read counter), second warm data (e.g., data associated with a block having 55,000 read counter), and cold data (e.g., data associated with a block having 30,000 read counter). In this example, if the TLC block 768 is instead configured as a QLC block (e.g., BICS5-X4) with 1-2-4-8 encoding (e.g., meaning that a lower page requires 1 sense to read the page, a middle page requires 2 senses, an upper page requires four senses, and a top page requires 8 senses), then the hot data may be moved to the lower page (LP-1), the first warm data may be moved to the middle page (MP-2), the second warm data may be moved to the upper page (e.g., UP-4), and the cold data may be moved to the top page (TP-8). As such, the data may be copied into pages of the QLC block in a gradual manner according to the hotness of the block from which the data came.

It should be noted that even when the data is folded into TLC block 708 of FIG. 7A or the TLC block 768 of FIG. 7B, a read counter (e.g., a data validity counter (VC)) may still be measured in the SLC blocks from which the data was copied (e.g., SLC blocks of FIG. 7A or FIG. 7B). Thus, the TLC block 708/768 may still be represented by the individual SLC blocks, and the individual read counters associated with each of the SLC blocks may be maintained for the TLC block 708/768. Thus, read commands for particular pages of the TLC block 708/768 may be continually counted by the read counter of the corresponding SLC block.

Figure 8:
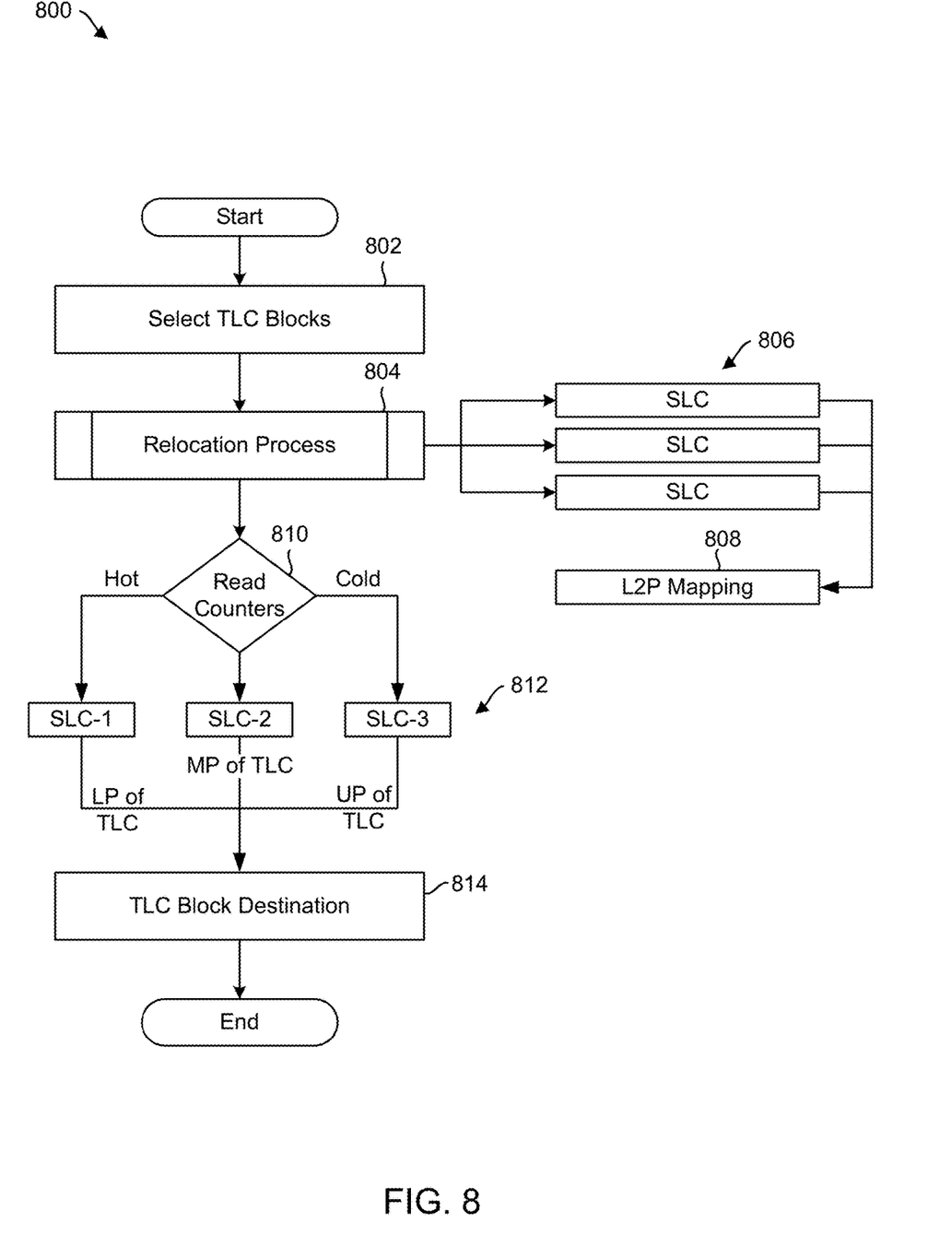
FIG. 8 is a flow chart illustrating an example relocation process.

FIG. 8 is a flow chart illustrating an example relocation process 800. Although the flow chart in shown in the context of a relocation from a first TLC to SLC to a second TLC, other combinations of multi-level cells are contemplated. For example, the first TLC and the second TLC may be any combination of QLC, PLC, or any other suitable multi-level cell.

At a first step 802, a controller (e.g., controller 123 of FIG. 1) may select one or more TLC blocks for relocation process 800. The one or more TLC blocks may include any suitable number of blocks, and may be a combination of one or more TLC blocks, QLC blocks, PLC blocks, and/or any other suitable multi-level cell blocks. The selection may be based on a determination, by the controller, that the one or more TLC blocks contain invalid data.

At a second step 804, the controller may begin a reallocation process, wherein the valid data contained in the selected blocks is relocated for GC. In this example, a first TLC block may be one of the blocks selected for the relocation process 800, wherein that first TLC block is associated with three counters corresponding to a first set of three SLC blocks 806. That is, the first TLC block may include three pages, wherein each page is associated with a separate SLC block of the first set of three SLC blocks 806, and thus, a separate read counter (e.g., validity counter (VC)). The mapping of the three pages to the first set of three SLC blocks 806 may be provided in a logical-to-physical (L2P) mapping 808.

At a third step 810, the controller may read the read counters to determine a hotness of the data stored in each page of the first TLC block based on the read counter associated with each SLC block of the first set of three SLC blocks 806. The controller may then copy data from the first TLC block and write it to one of a second set of three SLC blocks 812. Initially, the controller may earmark or otherwise provide an indication associated with each of the second set of three SLC blocks 812 designating that SLC block as containing hot, warm, or cold data. More or fewer designators may be used. For example, if the second set of SLC blocks contained only two blocks, the designator may be hot and cold. If more than three, additional designators may be used. In this example, the controller has designated SLC-1 as having hot data, SLC-2 as having warm data, and SLC-3 as having cold data.

Thus, the controller may move data having the highest number of read counts from the first TLC block to SLC-1, move data having the second highest number of read counts from the first TLC block to SLC-2, and move data having the third highest number of read counts from the first TLC block to SLC-3.

At a fourth step 814, the controller may move data from the second set of three SLC blocks 812 to a destination TLC block. In one example, the destination TLC block may be a BICS5-X3 with an encoding of 1-3-3 (e.g., LP-1, MP-3, UP-3). That is, the destination TLC block includes a lower page that requires 1-sense for a read, a middle page that requires 3-senses for a read, and an upper page that requires 3-senses for a read. Thus, the controller may determine to fold the hot data (e.g., data copied into SLC-1 of the second set of three SLC blocks 812 to the lower page of the destination TLC block, fold the warm data (e.g., data in SLC-2) into the middle page of the destination TLC block, and fold the cold data (e.g., data in SLC-3) into the upper page of the destination TLC block.

It should be noted that after folding the data into the destination TLC block, each of the second set of three SLC blocks 812 may maintain separate read counters for the individual pages of the TLC block. For example, SLC-1 may maintain a first read counter for data in the lower page, SLC-2 may maintain a second read counter for data in the middle page, and SLC-3 may maintain a third read counter for data in the upper page. As such, as the hotness/coldness of data in the destination TLC block changes, the data may be relocated accordingly.

Figure 9:
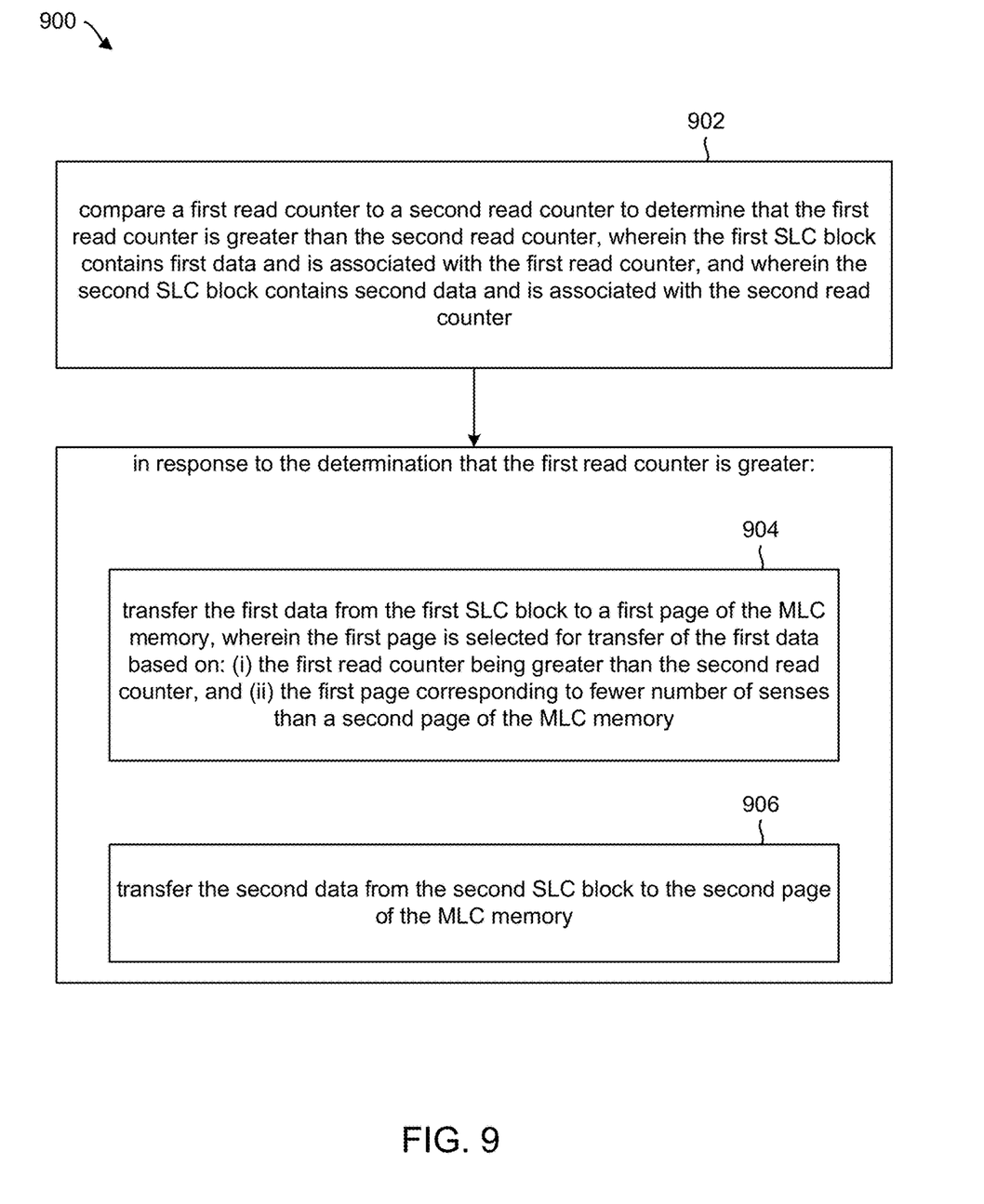
FIG. 9 is a flow diagram illustrating example operations performed by a memory controller.

FIG. 9 is a flow diagram illustrating example operations 900 performed by a memory controller (e.g., memory controller 123 of FIG. 1).

At a first block 902, the controller may compare a first read counter to a second read counter to determine that the first read counter is greater than the second read counter, wherein the first SLC block contains first data and is associated with the first read counter, and wherein the second SLC block contains second data and is associated with the second read counter. For example, the controller may perform the third step 810 of FIG. 8. Here, the first read counter may correspond to a first SLC and the second read counter may correspond to a second SLC, wherein each of the read counters is indicative of a number of read commands the controller received from a host directed to a one of the first SLC and the second SLC.

At a second block 904, and in response to the determination that the first read counter is greater, the controller may transfer the first data from the first SLC block to a first page of the MLC memory, wherein the first page is selected for transfer of the first data based on: (i) the first read counter being greater than the second read counter, and (ii) the first page corresponding to fewer number of senses than a second page of the MLC memory. For example, the controller may perform the fourth step 814 of FIG. 8. Here, because the data from the first SLC block is associated with the highest number of read command counts, that data is copied to a first page of the MLC block with the fewest number of senses required for a read of that block.

At a third block 906, and in response to the determination that the first read counter is greater, the controller may transfer the second data from the second SLC block to the second page of the MLC memory. For example, the controller may perform the fourth step 814 of FIG. 8. Here, because the data from the second SLC block is associated with a lower number of read command counts relative to the first SLC block, the data from the second SLC block is copied to a second page of the MLC block requiring equal or more of senses required for a read relative to the first page.

In certain aspects, the first read counter is configured to maintain a number of read commands received for the first SLC block, and wherein the second read counter is configured to maintain a number of read commands received for the second SLC block.

In certain aspects, the MLC memory is one of a triple-level cell (TLC), a quad-level cell (QLC), or a penta-level cell (PLC). Although it should be noted that the MLC memory may be any suitable memory with more than one levels.

In certain aspects, the number of senses is indicative of a number of voltage senses for reading a corresponding page of the MLC memory.

In certain aspects, the operations 900 further include the controller comparing the first read counter to the second read counter in response to a garbage collection (GC) function.

In certain aspects, the operations 900 further include the controller transferring the first data and the second data as part of a relocation process performed in response to the garbage collection function.

Figure 10:
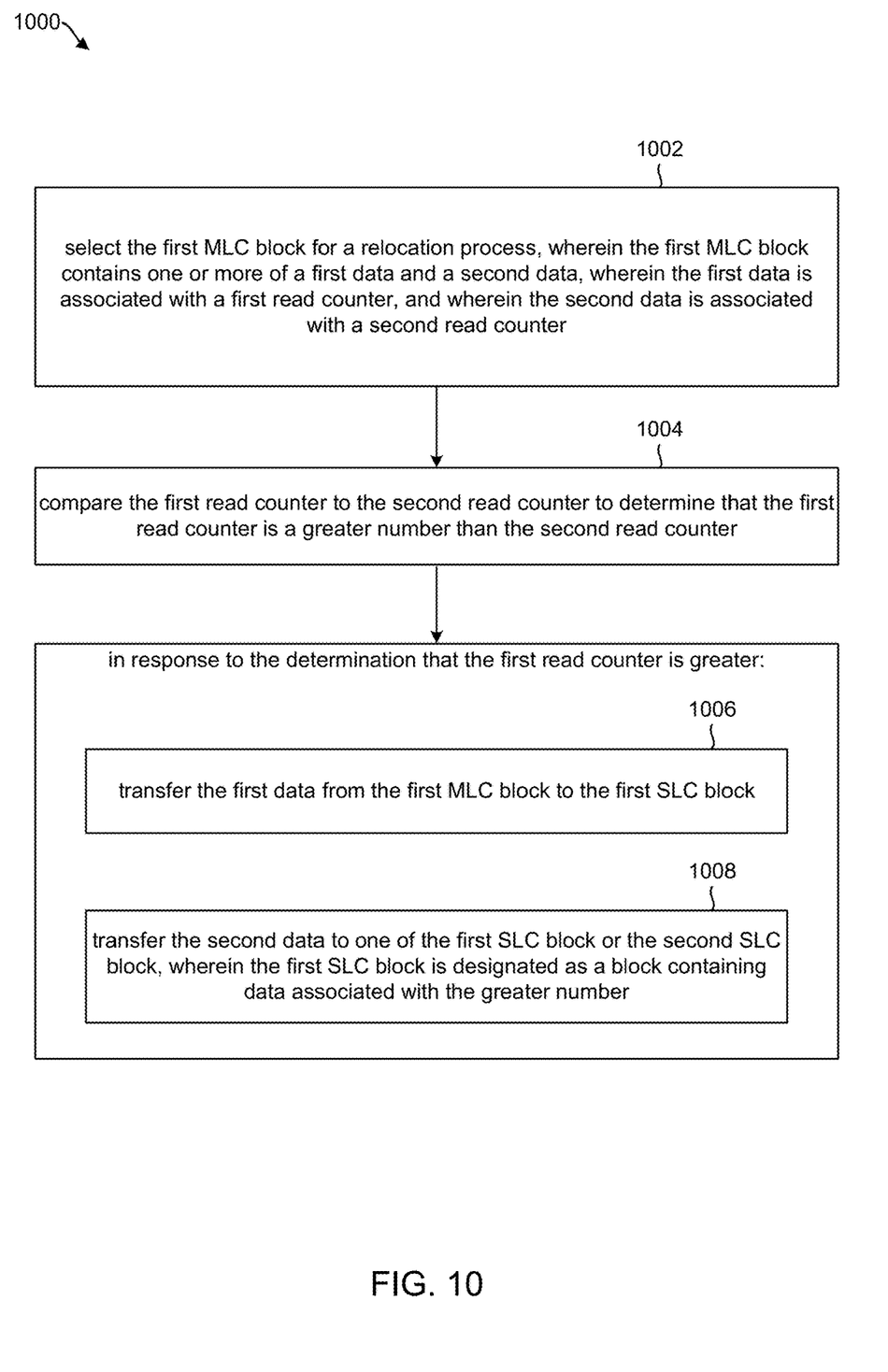
FIG. 10 is a flow diagram illustrating example operations performed by a memory controller.

FIG. 10 is a flow diagram illustrating example operations 1000 performed by a memory controller (e.g., memory controller 123 of FIG. 1).

At a first block 1002, the controller may select the first MLC block for a relocation process, wherein the first MLC block contains one or more of a first data and a second data, wherein the first data is associated with a first read counter, and wherein the second data is associated with a second read counter. For example, the controller may perform the first step 802 of FIG. 8. Here, the controller may select the first MLC block based on a determination that the first MLC block contains invalid data, and/or the first MLC block is physically full of data.

At a second block 1004, the controller may compare the first read counter to the second read counter to determine that the first read counter is a greater number than the second read counter. For example, the controller may perform the third step 810 of FIG. 8. Here, the first read counter may correspond to a first SLC and the second read counter may correspond to a second SLC, wherein each of the read counters is indicative of a number of read commands the controller received from a host directed to a one of the first SLC and the second SLC. The data associated with a read counter having a highest relative read count is considered "hot" data and may be earmarked to be folded into a page of an MLC having the fewest number of senses required for a read command.

At a third block 1006, and in response to the determination that the first read counter is greater, the controller may transfer the first data from the first MLC block to the first SLC block. For example, the controller may perform the third step 810 of FIG. 8. Here, the first SLC block may be earmarked or designated to receive valid data that is determined to be hot. The hot data may then be folded into a page of another MLC block having a lowest number of senses.

At a fourth block 1008, and in response to the determination that the first read counter is greater, the controller may transfer the second data to one of the first SLC block or the second SLC block, wherein the first SLC block is designated as a block containing data associated with the greater number. For example, the controller may perform the third step 810 of FIG. 8. Here, the second SLC block may be earmarked or designated to receive valid data that is not as hot as the data coped to the first SLC.

In certain aspects, the operations 1000 may include the controller, in response to the determination that the first read counter is greater, generating an indication that the first data is to be transferred from the first SLC block to a lower page of the second MLC block after being transferred to the first MLC block. For example, the controller may perform the third step 810 of FIG. 8. Here, the controller may flag the first SLC block as a block that contains the hot data so that the controller knows to fold the data in the first SLC into a page of the MLC with the lowest number of senses required for a read command.

In certain aspects, the operations 1000 may include the controller transferring the first data from the first SLC block to a lower page of the second MLC block; and transferring the second data from the second SLC block to another page of the second MLC block. For example, the controller may perform the fourth step 814 of FIG. 8. Here, the lower page requires the least number or senses for a read command. The other page may include the same number of senses or more.

In certain aspects, the lower page is a one sense page, and the other page is a more than one sense page.

In certain aspects, the first MLC block comprises an aggregation of a third SLC block and a fourth SLC block, wherein the first read counter is associated with the third SLC block, and wherein the second read counter is associated with the fourth SLC block.

In certain aspects, the first read counter is configured to track a number of read commands received for the first data, and wherein the second read counter is configured to track a number of read commands received for the second data.

In certain aspects, each of the first MLC memory and the second MLC memory is one of a triple-level cell (TLC), a quad-level cell (QLC), or a penta-level cell (PLC).

In certain aspects, the controller is further configured to compare the first read counter to the second read counter in response to a garbage collection function.

In certain aspects, the controller is further configured to transfer the first data and transfer the second data as part of a relocation process performed in response to the garbage collection function.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
multiple memory devices comprising a first single-level cell (SLC) block, a second SLC block, a multi-level cell (MLC) block; and
a controller coupled to the multiple memory devices, the controller configured to:
compare a first read counter to a second read counter to determine that the first read counter is greater than the second read counter, wherein the first SLC block contains first data and is associated with the first read counter, and wherein the second SLC block contains second data and is associated with the second read counter; and
in response to the determination that the first read counter is greater:
transfer the first data from the first SLC block to a first page of the MLC block, wherein the first page is selected for transfer of the first data based on: (i) the first read counter being greater than the second read counter, and (ii) the first page corresponding to fewer number of senses than a second page of the MLC block; and transfer the second data from the second SLC block to the second page of the MLC block.

2. The storage device of claim 1, wherein the first read counter is configured to maintain a number of read commands received for the first SLC block, and wherein the second read counter is configured to maintain a number of read commands received for the second SLC block.

3. The storage device of claim 1, wherein the MLC block is one of a triple-level cell (TLC), a quad-level cell (QLC), or a penta-level cell (PLC).

4. The storage device of claim 1, wherein the number of senses is indicative of a number of voltage senses for reading a corresponding page of the MLC block.

5. The storage device of claim 1, wherein the controller is further configured to compare the first read counter to the second read counter in response to a garbage collection function.

6. The storage device of claim 5, wherein the controller is further configured to transfer the first data and transfer the second data as part of a relocation process performed in response to the garbage collection function.

7. A storage device, comprising:
multiple memory devices comprising a first single-level cell (SLC) block, a second SLC block, a first multi-level cell (MLC) block, and a second MLC block; and
a controller coupled to the multiple memory devices, the controller configured to:
select the first MLC block for a relocation process, wherein the first MLC block contains one or more of a first data and a second data, wherein the first data is associated with a first read counter, and wherein the second data is associated with a second read counter;
compare the first read counter to the second read counter to determine that the first read counter is a greater number than the second read counter; and
in response to the determination that the first read counter is greater:
transfer the first data from the first MLC block to the first SLC block; and
transfer the second data to one of the first SLC block or the second SLC block, wherein the first SLC block is designated as a block containing data associated with the greater number.

8. The storage device of claim 7, wherein the controller, in response to the determination that the first read counter is greater, is further configured to:
generate an indication that the first data is to be transferred from the first SLC block to a lower page of the second MLC block after being transferred to the first MLC block.

9. The storage device of claim 8, wherein the controller is further configured to:
transfer the first data from the first SLC block to a lower page of the second MLC block; and
transfer the second data from the second SLC block to another page of the second MLC block.

10. The storage device of claim 9, wherein the lower page is a one sense page, and wherein the other page is a more than one sense page.

11. The storage device of claim 7, wherein the first MLC block comprises an aggregation of a third SLC block and a fourth SLC block, wherein the first read counter is associated with the third SLC block, and wherein the second read counter is associated with the fourth SLC block.

12. The storage device of claim 7, wherein the first read counter is configured to track a number of read commands received for the first data, and wherein the second read counter is configured to track a number of read commands received for the second data.

13. The storage device of claim 7, wherein each of the first MLC block and the second MLC block is one of a triple-level cell (TLC), a quad-level cell (QLC), or a penta-level cell (PLC).

14. The storage device of claim 7, wherein the controller is further configured to compare the first read counter to the second read counter in response to a garbage collection function.

15. The storage device of claim 14, wherein the controller is further configured to transfer the first data and transfer the second data as part of a relocation process performed in response to the garbage collection function.

16. A method for segregating data in a multi-level cell (MLC) block, comprising:
comparing a first read counter to a second read counter to determine that the first read counter is greater than the second read counter, wherein a first single-level cell (SLC) block contains first data and is associated with the first read counter, and wherein a second SLC block contains second data and is associated with the second read counter; and
in response to the determination that the first read counter is greater:
transferring the first data from the first SLC block to a first page of the MLC block, wherein the first page is selected for transfer of the first data based on: (i) the first read counter being greater than the second read counter, and (ii) the first page corresponding to fewer number of senses than a second page of the MLC block; and
transferring the second data from the second SLC block to the second page of the MLC block.

17. The method of claim 16, wherein the first read counter is configured to maintain a number of read commands received for the first SLC block, and wherein the second read counter is configured to maintain a number of read commands received for the second SLC block.

18. The method of claim 16, wherein the MLC block is one of a triple-level cell (TLC), a quad-level cell (QLC), or a penta-level cell (PLC).

19. The method of claim 16, wherein the number of senses is indicative of a number of voltage senses for reading a corresponding page of the MLC block.

20. The method of claim 16, wherein comparing the first read counter to the second read counter is in response to a garbage collection function.

* * * * *